WESLEY D. BOYER
INVENTOR

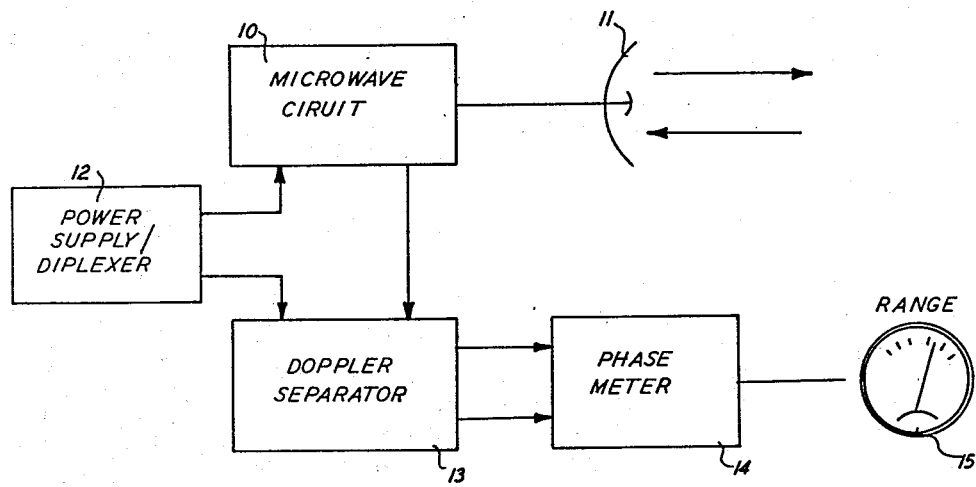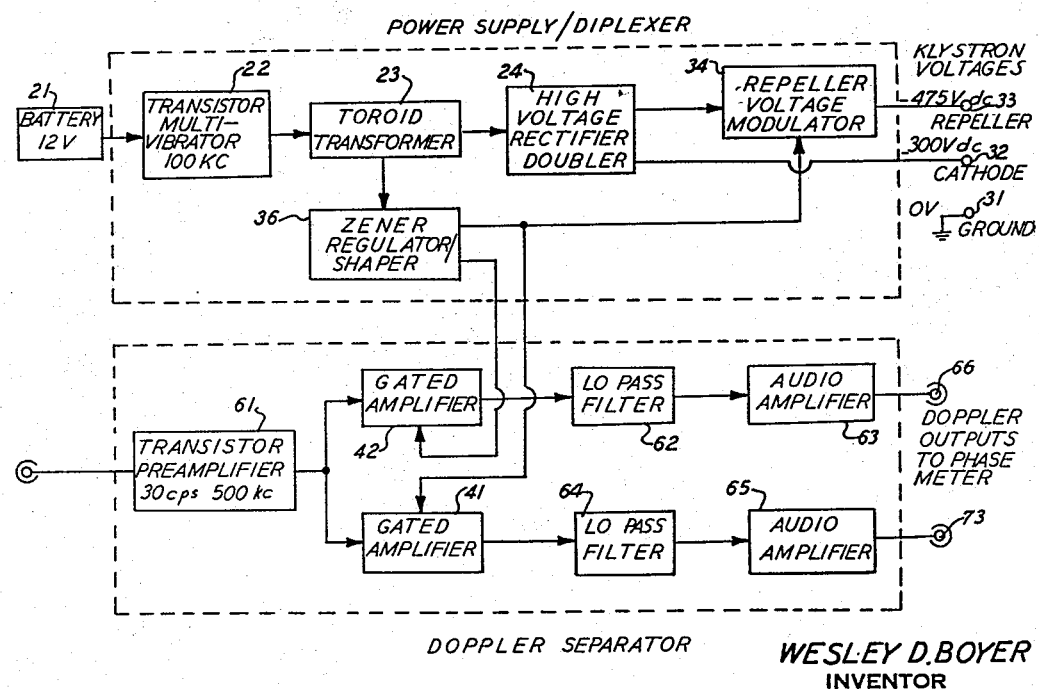

3,155,972
CONTINUOUS WAVE RADAR
Wesley D. Boyer, Dearborn, Mich., assignor to Ford Motor Company, Dearborn, Mich., a corporation of Delaware
Filed Mar. 22, 1963, Ser. No. 267,181
6 Claims. (Cl. 343—12)

This invention relates to a continuous wave radar system and more particularly to a continuous wave radar system of the Doppler phase comparison type in which a single tube transmitter is switched between two frequencies at a rate substantially greater than the maximum Doppler frequency expected to be received.

When two microwave signals closely spaced in frequency are transmitted, each gives rise to a corresponding Doppler signal when it is reflected from a moving target. The Doppler signals are nearly identical within a given range except for a phase shift of one with respect to the other. For a given frequency difference of the transmitters, the phase difference is linearly dependent upon the distance to the target.

In the present invention a novel phase comparison radar system is provided that is based upon the principles discussed above. In this system a single transmitter tube, preferably in the form of a reflex klystron, is employed. Means are provided to impress voltages upon the reflex klystron, for example, the repeller electrode, such that the klystron alternately and periodically generates two microwave signals closely spaced in frequency. A square wave, for example, may be applied to the repeller of the reflex klystron. When the square wave is of maximum amplitude the reflex klystron will generate microwave energy of one frequency and when the square wave is at a minimum amplitude the reflex klystron will generate microwave energy of a different frequency. The frequency difference is dependent upon the amplitude of the square wave or, stated otherwise, it is dependent upon the difference between the maximum and minimum voltages of the square wave. The frequency of this square wave is designed to be substantially greater than the maximum frequency of any Doppler signal expected to be received.

The two microwave signals are propagated towards a target by means of a single antenna and the echo signals are reflected from the target and received by this same antenna. Proper means are provided for separating the transmitted and received signals, and the received signals are mixed in a mixer or detector with the signals generated by the reflex klystron. If the signals are reflected from a target having a relative velocity with respect to the radar system, a pair of Doppler signals chopped at the switching rate or the frequency of the square wave applied to the repeller of the reflex klystron are detected in the mixer. From the mixer or detector these signals are applied to a pair of gated amplifiers that are gated by the square wave applied to the repeller of the reflex klystron. This gating signal alternately cuts off and brings into conduction each of the gated amplifiers in synchronism with the two different frequencies of energy generated by the reflex klystron. Thus, one of the amplifiers accepts and amplifies the chopped Doppler signal that is the result of the energy transmitted at one frequency, while the other gated amplifier receives and amplifies the chopped Doppler signal that is the result of the energy transmitted at the other frequency. Low pass filters are connected to each of the gated amplifiers to pass the Doppler signal and to filter out the higher frequency components that are the result of the chopping of the Doppler signal. The two Doppler signals art then applied to a phase meter, and this phase meter gives an indication of the range to the target as a linear function of the phase difference between the two Doppler signals. The phase meter is such that it can differentiate between receding and approaching targets, and it gives an indication as to whether these moving targets are approaching or receding.

An object of the invention is the provision of a continuous wave Doppler phase comparison radar that is uncomplicated and uses a minimum number of components.

Another object of the invention is the provision of a continuous wave Doppler phase comparison radar in which time multiplexing techniques are employed to produce a usable and inexpensive system.

A further object is the provision of a continuous wave Doppler phase comparison radar that may be used to detect objects that have relative velocities with respect to the radar and that can be made practical for ranges from several hundred feet down to a very few inches.

Other objects and attendant advantages of the invention will become more apparent as the attached drawings are considered in connection with the specification, in which, FIGURE 1 is a block diagram of the complete radar system of this invention;

FIGURE 2 is a block diagram of the power supply-diplexer and the Doppler separator shown in the blocks in FIGURE 1;

Figure 3:
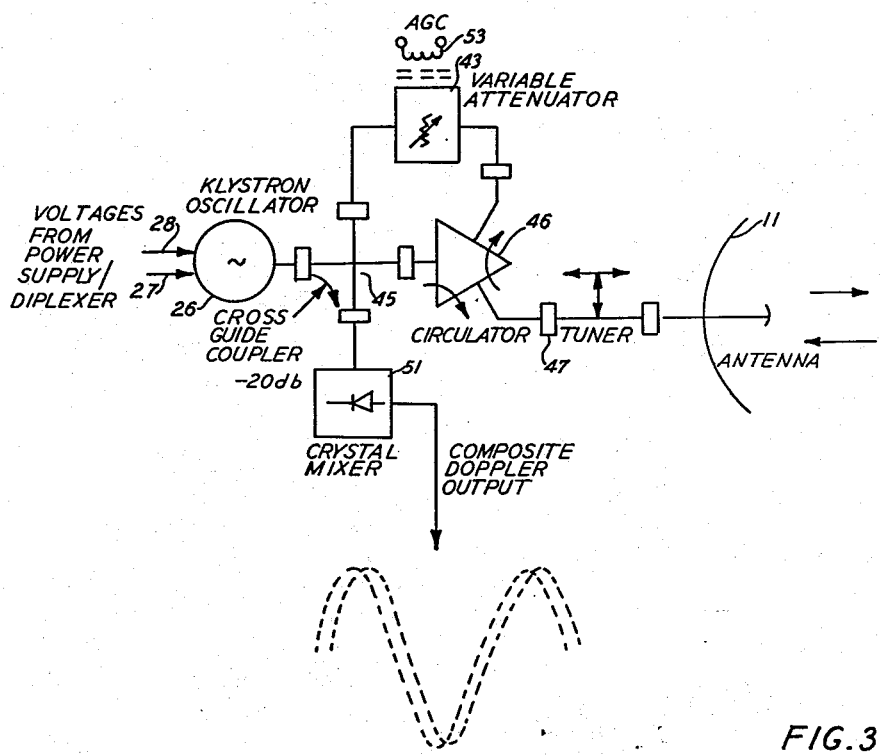
FIGURE 3 is a block diagram and schematic of the microwave circuit shown in FIGURE 1.

The principle of ranging by phase comparison of Doppler signals is presented here for purposes of clarity and to form a basis for a complete understanding of the invention.

A single unmodulated continuous wave, radio frequency signal may be represented as a phasor $$S_{T,1} = A_1 e^{jw_0 t} \quad (1)$$

the real part of the complex expression being understood. If this signal is transmitted in a continuous medium, reflected from a target with a possible phase change $\theta$, and received back at the transmitter position it will have been attenuated (by the factor $a$) and delayed in time by distance ($r$) and target ($s$) dependent functions.

$$S_{R,1} = a_{(r, s)} A_1 e^{j(w_0 t - \theta - w_0 \tau)} \quad (2)$$

The total delay time is a function of the variable position only:

$$\tau = \frac{2r}{c} \quad (3)$$

$r$ being the one way range; and $c$, the speed of wave propagation.

A signal is obtained by mixing the received signal $S_{R,1}$ with a sufficiently large portion of the transmitted signal $S_{T,1}$. The resulting signal $S_{D,1}$ may be looked upon as having an amplitude the same as $S_{R,1}$ and as being periodic in $r$ for every half-wave-length of the transmitted signal: thus $$S_{D,1} = a_{(r,s)} A_1 \epsilon^{-j(\theta + w_0 \tau)} \quad (4a)$$

$$= a_{(r,s)} A_1 \epsilon^{-j\left(\theta + 2\frac{rw_0}{c}\right)} \quad (4b)$$

$S_{D,1}$ is periodic in time and truly the Doppler signal only if $r$ is a continuous function of time during a particular time interval of interest. For a target moving with a constant velocity $v_r$ relative to the transceiver the derivative with respect to time of the phase angle of $S_{D,1}$ in Equation $4b$ yields the conventional Doppler angular frequency.

$$w_{D,1} = \frac{d}{dt}\left(\theta + 2\frac{rw_0}{c}\right) \quad (5a)$$

$$= \frac{2w_0}{c}\frac{dr}{dt} \quad (5b)$$

$$= \frac{2v_r}{c} w_0 \quad (5c)$$

A second unmodulated CW, RF signal whose frequency differs from $w_0$ by a relatively small $w_1$ gives rise to the following relations corresponding respectively to Equations 1, 2, $4b$, and $5c$.

$$S_{T,2} = A_2 \epsilon^{j(w_0+w_1)t} \quad (6)$$

$$S_{R,2} = a_{(r,s)} A_2 \epsilon^{j[(w_0+w_1)t - \theta - (w_0+w_1)\tau]} \quad (7)$$

$$S_{D,2} = a_{(r,s)} A_2 \epsilon^{-j\left[\theta + \frac{r}{2c}(w_0+w_1)\right]} \quad (8)$$

$$w_{D,2} = 2\frac{V_r}{c}(w_0+w_1) \quad (9)$$

The absolute phase angle of each of the Doppler signals $S_{D,1}$ and $S_{D,2}$ is given by the exponent of the phasor such that $$\phi_{D,1} = -\theta - 2\frac{r}{c}w_0 \quad (10)$$

and $$\phi_{D,2} = -\theta - 2\frac{r}{c}(w_0+w_1) \quad (11)$$

Although $\theta$ was included in this development to account for an unknown phase shift of the reflected signal from the target it is easily eliminated because both RF signals are affected similarly. Taking the phase difference or measuring the relative phase shift of one Doppler wave with respect to the other gives the desired range equation:

$$\phi_{D,1} - \phi_{D,2} = \frac{2w_1}{c}r \quad (12)$$

or $$r = \frac{c}{2w_1}(\phi_{D,1} - \phi_{D,2}) \quad (13)$$

It should be noted that the individual components $S_{D,1}$ and $S_{D,2}$ vary sinusoidally in amplitude as a function of range, but which one leads or lags the other in time phase depends upon the direction of target movement. For the range intervals under consideration, if the signal resulting from $w_0$, one of the frequencies transmitted, lags the other resulting from the other frequency transmitted $w_0+w_1$, the target is receding from the system. If the range is decreasing and the target approaches the system, then the signal resulting from the transmitted signal $w_0$ leads the signal resulting from the other transmitted signal $w_0+w_1$. This information, along with the measure of the Doppler frequency, gives the sense of direction of the relative motion and gives complete information on the radial velocity vector component of the moving target. For a practical phase meter that is capable of reading both plus and minus 180°, the results are linear and unique within the range interval $\pi c/2w_1$.

Referring now to the drawings in which like reference numerals designate like parts throughout the several views thereof, there is shown in FIGURE 1 a block diagram of the radar system of this invention. The system comprises a microwave circuit 10 that feeds an antenna 11. A power supply and diplexer 12 provides power for the microwave circuit and provides a diplexing signal for switching the microwave circuit so that it generates a microwave signal of one frequency and a microwave signal of another frequency on a time shared basis. This will be more fully explained with relation to FIGURES 2 and 3.

The antenna 11 also receives energy reflected from a target and this reflected microwave energy is brought into the microwave circuit where it is mixed with an attenuated portion of the transmitted microwave energy. If there is relative movement between the target and the system, a pair of chopped Doppler signals will be produced. These chopped Doppler signals are fed to a Doppler separator 13 that is also connected to receive the diplex signal that is fed to the microwave circuit. The two chopped Doppler signals are separated by means of a pair of gated amplifiers that are gated by the diplex signal received from the power supply-diplexer 12. The higher frequency components of the chopped Doppler signals received from the microwave circuit 10 are filtered out in the Doppler separator 13 by means of low pass filters. The fully constructed Doppler signals are then fed to a phase meter 14 which compares the phase of the two Doppler signals. The output of the phase meter is fed to an indicating device 15 on which range is indicated. The indicating device may take the form of a standard D.C. voltmeter.

Referring now to FIGURE 2, there is shown a block diagram of the power supply-diplexer and the Doppler separator. The power supply-diplexer may be connected to an ordinary 12 volt vehicle storage battery 21 that serves as a source of electrical energy. This battery is connected to a transistor multivibrator 22 that may take the form of two high frequency power transistors operated in push-pull for delivering power at 100 kc. rate from the 12 volt storage battery to a toroid transformer 23. The output wave form from the multivibrator is roughly square. This toroid transformer steps up the 100 kc. square wave that is received from the multivibrator and applies it to a standard high voltage rectifier and doubler 24. This purpose of the high voltage rectifier and doubler is to rectify the high voltage A.C. output from the toroid transformer 23 to provide two voltages that may be applied to the electrodes of the microwave generator.

As shown in FIGURE 3, the microwave generator may take the form of a reflex klystron oscillator 26 having a cathode 27 and a repeller 28. Referring back to FIGURE 2, the klystron voltages shown are a ground potential that is available at terminal 31 for application to the body and cavity of the klystron. A negative voltage, for example, a negative 300 volt D.C. voltage, is available from the high voltage rectifier doubler at the terminal 32 for application to the cathode 27 of the reflex klystron oscillator 26. A third voltage more negative than that available at the terminal 32 is available at the terminal 33 for application to the repeller electrode 28 of the klystron oscillator 26. The voltage available at the terminal 33 may be a negative D.C. voltage of 475 volts. The voltage available at terminal 33 is supplied from the high voltage rectifier and doubler 24 through a repeller voltage modulator 34 which passes the 475 volt D.C. voltage from the high voltage rectifier doubler 24 and also receives a modulating voltage in the form of a square wave that is superimposed upon the D.C. voltage.

The Zener regulator-shaper 36 is coupled to the toroid transformer 23 by means of a third transformer winding. The Zener regulator-shaper 36 includes a first Zener diode having its cathode connected to one end of the third transformer winding and having its anode connected to ground and a second Zener diode having its anode connected to the other end of the transformer winding and having its cathode connected to ground. This Zener regulator-shaper limits the substantially square waves available at each end of the third winding of the toroid transformer 23. It can be appreciated that a square wave is available at each end of the third winding of the toroid transformer. At one end of the winding there will be one square wave and at the other end of the winding there will be another square wave that is inverted with respect to the square wave at the first end of the winding.

One of the square waves that has been limited and shaped by the Zener regulator-shaper is supplied to the repeller voltage modulator 34 where it is combined with the negative voltage that is received from the high voltage rectifier doubler 24. Thus there is supplied to the repeller electrode a steady state or negative voltage that has superimposed upon it an A.C. square wave.

The Zener regulator-shaper 36 also supplies the square wave that is supplied to the repeller voltage modulator 34 to a gated amplifier 41 positioned in the Doppler separator 13. The inverted square wave voltage is applied to a gated amplifier 42. This action will be explained more fully subsequently.

The microwave circuit is shown in FIGURE 3, and it includes the reflex klystron oscillator 26 that supplies power to a cross guide directional coupler 45. The cross guide directional coupler 45 is connected to supply power to a circulator 46 and the circulator is connected to a tuner 47 which supplies power to the antenna 11. The reflected signal from the target is received by the antenna and is passed by the circulator 46 through a variable attenuator 48 that may be used in relation to an optional automatic gain control circuit. The reflected signal is then applied through the cross guide coupler 45 to a crystal mixer or detector 51. A sample of the generated power from the klystron oscillator 26 (down approximately 20 to 30 db from the signal generated) is also applied to the crystal mixer or detector 51 through the cross guide coupler 45. This known sample is used as the local oscillator signal for the homodyne process in which the incoming or reflected signal is mixed with this sample in the crystal mixer or detector 51. The crystal mixer or detector 51 detects the two Doppler signals and they appear at the output of the crystal mixer or detector 51 in chopped form, chopped at the frequency of the square wave modulating voltage applied to the repeller 28 of the klystron oscillator 26 from the power supply-diplexer.

The klystron oscillator 26 is a typical low power X-band reflex klystron. With a 500 foot maximum range for the radar system, the necessary frequency deviation of the two frequencies generated in the klystron oscillator and transmitted will be on the order of plus or minus 123 kc. This can be achieved by a square wave applied to the repeller 28 of the klystron oscillator 26 that has a 246 millivolt peak-to-peak A.C. variation.

The variable attenuator 48 may take the form of a ferrite attenuator that has negligible effect on the received signal until current is forced through its control coil 53. The control coil may be connected to sense the amplitude of the Doppler signals received and current will be forced through it when the amplitudes of the Doppler signals near the upper limit of the systems dynamic range. This permits the received microwave signal to be delivered to the detector crystal at a level much lower than the local oscillator signal in order to assure proper mixing.

The output from the crystal mixer or detector 51, shown in FIGURE 3, is in the form of two Doppler signals chopped at the switching or diplexing frequency, for example, 100 kc. These two Doppler signals are applied to a transistor preamplifier 61 that may have a band width between 30 cycles per second and 500 kc. The output of this transistor preamplifier is connected to gated amplifiers 41 and 42. The function of these two gated amplifiers is to separate or extract the two individual Doppler signals from the amplified composite signal available at the output of the transistor amplifier 61. The gated amplifiers may be normally class A biased common emitter transistor amplifiers in which the square wave gating signals from the Zener regulator-shaper 36 are applied to the emitters. For example, with a normal PNP transistor amplifier biased for conduction, the negative going portion of the square wave will bias the gated amplifier to cutoff.

Since one signal available from the Zener regulator-shaper 36 is applied to gated amplifier 41 and an inverted signal from the Zener regulator-shaper 36 with respect to the first signal is applied to the gated amplifier 42, these gated amplifiers are alternately biased to cutoff in synchronism with the square wave applied to the repeller electrode 28 of klystron oscillator 26 through the repeller voltage modulator 34 and the terminal 33. This action separates the two Doppler signals so that one appears in chopped form at the output of gated amplifier 42 and the other appears in chopped form at the output 41. The output from the gated amplifier 42 in the form of one of the chopped Doppler signals is fed to a low pass filter 62 where the high frequency components are filtered thus leaving the clean Doppler signal to be applied to a first audio amplifier 63. The other chopped Doppler signal available at the output of gated amplifier 41 is applied to low pass filter 64 and then to audio amplifier 65. The outputs of the two audio amplifiers 63 and 64 are thus fully constructed and clean Doppler signals that have phase differences proportional to the range between the system and a target. The signals are applied to a phase meter shown in block diagram form in FIGURE 4. The output of the audio amplifier 63 is applied through a terminal 66 to a diode limiter 71 while the output from audio amplifier 65 is applied to a diode limiter 72 through a terminal 73. It can be appreciated from an inspection of FIGURE 4 that the channel for operating on one Doppler signal is identical to the channel that operates on the other Doppler signal. Only the upper channel, therefore, will be described.

Amplification of the very weak signals which result from targets at the maximum range is required before phase comparison can practically be made. Linear amplification is not necessary inasmuch as only the timing or phasing of the signals need to be preserved. In the upper channel of the phase meter, the signal from the diode limiter 71 is applied to an amplifier 74 stage and the output from this amplifier stage 74 is applied to another diode limiter 75. The output from the diode limiter 75 is applied to an amplifier stage 76. It can be seen that the Doppler signal, therefore, is limited, then amplified, then further limited and further amplified to provide a trapezoidal wave form. This wave form is then applied to a squaring amplifier 77 that puts out a square wave. The squaring amplifier 77 serves as an amplitude gate that allows only signals above its triggering amplitude to pass. It also gives a rectangular output wave of uniform amplitude and rise time regardless of the amplitude and frequency of the input wave form.

The bottom channel, as stated previously, is identical to the top channel and includes amplifier stage 81 connected to diode limiter 72, second diode limiter 82, and second amplifier stage 83. The second amplifier stage is connected to a squaring amplifier 84.

The squaring amplifiers 77 and 84 have a normal output and an inverted output. The normal output from the square wave amplifier 77 is applied to a reset flip-flop 85 while the inverted output from the squaring amplifier 84 is applied to the reset flip-flop 85. If the Doppler signal applied at the terminal 66 is exactly in phase with the Doppler signal applied to the terminal 73, the output from the reset flip-flop 85 would be a square wave in which the average value is exactly zero. The average voltage applied to the range indicator 15 will, therefore, be zero, thus indicating a zero range.

Figure 4:
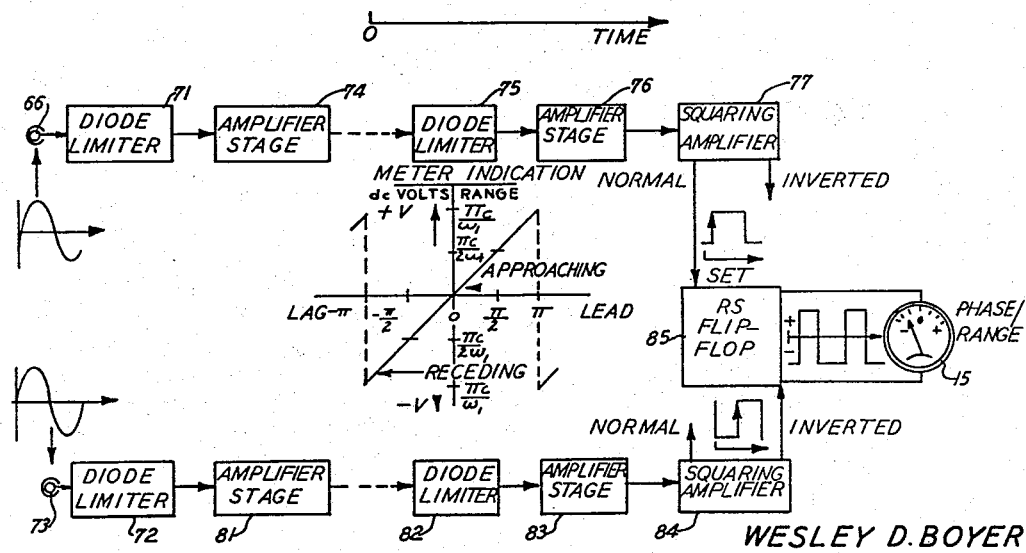
FIGURE 4 is a block diagram of the phase meter shown in FIGURE 1.

If, however, as shown in the drawings in FIGURE 4, the input wave applied to the upper channel via terminal 66 lags the Doppler signal applied to the lower channel through the terminal 73, the output wave from the RS flip-flop will be modified so that the width of the negative portion of the wave exceeds the width of the positive portion. The average voltage, therefore, is negative and the voltmeter will indicate a negative value. The magnitude of this voltage is a linear function of range while its polarity (negative) indicates that the target is receding from the system.

If, on the other hand, the Doppler signal applied to the upper channel through the terminal 66 leads the Doppler signal applied to the lower channel through the terminal 73, the positive portion of the rectangular wave derived from the RS flip-flop would exceed in width the negative portion of that wave. This gives an average positive value to the voltage present at the output of the RS flip-flop. The magnitude of this voltage is linearly related to range while the polarity (positive) indicates that the target is approaching the system.

As indicated in FIGURE 4, the full scale sensitivity of the indicator 15 may be adjusted for any practical resolution of range between zero and the maximum unambiguous distance determined by $\pi c/w_1$. If the full scale reading of the meter is set to indicate $\pi c/4w_1$, that is, a plus or minus 90° phase shift, a long buffer zone is established in which no reading is obtained. The amplitude sensitivity of the squaring amplifiers may be adjusted for an average target to the point where it is unlikely that any target beyond $3\pi c/4w_1$ would produce a return strong enough to be construed as a closer target. The problem of ambiguity, therefore, is reduced significantly, but at the expense of range resolution.

With this arrangement it can be seen that the gated amplifier 42 is gated to accept the signals or chopped Doppler signal generated by the lower frequency generated by the klystron oscillator and transmitted by the antenna, while the gated amplifier 41 is gated to amplify and pass that Doppler signal which is generated by the higher frequency signal generated by the klystron oscillator and transmitted by the antenna. As discussed in the introductory part of the specification, the lower frequency signal generated by the klystron oscillator carries the designation $w_0$ while the higher frequency carries the designation $w_0+w_1$.

The range rate or relative velocity between the target and the system can be obtained by sensing the frequency of either of the Doppler signals. This can be accomplished, for example, by connecting a frequency meter to either output terminal 66 or 73 of either amplifier 63 or 65.

The radar system of this invention can be constructed from standard electrical components as called for by the block diagrams and the block diagram and schematic of the microwave circuit shown in FIGURE 3.

The present invention thus provides an uncomplicated and inexpensive continuous wave Doppler phase comparison radar system that may be powered by a standard automotive vehicle battery and that may be employed to give range indications of interest to a vehicle operator. For the various components and values described in the specification, the system would give range indication from approximately 500 down to several feet. Of course, with suitable modification this system could be made to operate over ranges several times that specified.

It will be understood that the invention is not to be limited to the exact construction shown and described, but that various changes and modifications may be made without departing from the spirit and scope of the invention as defined in the appended claims.

I claim:

1. A continuous wave radar system for measuring range to an object that has a relative velocity with respect to the system comprising, a microwave generator, means coupled to said microwave generator for causing said microwave generator to alternately and periodically generate microwave energy having two different frequencies, means for transmitting said microwave energy to the object, and for receiving the microwave energy reflected from the object, means coupled to said last mentioned means for obtaining a Doppler signal that results from each of said two different frequencies of microwave energy, and means for comparing the phase of said Doppler signals to provide an indication of the range to the target.

2. A Doppler phase comparison radar for measuring range to an object that has a relative velocity with respect to the system comprising, a microwave generator capable of producing two signals having two distinct and different frequencies, means coupled to said microwave generator for periodically switching said microwave generator between said two frequencies at a rate substantially greater than the maximum frequency of the Doppler signals expected to be received, means coupled to said microwave generator for transmitting said two signals of microwave energy toward the object and for receiving reflected signals of microwave energy reflected from the object as the result of said two signals impinging upon the object, means coupled to said last mentioned means for obtaining a Doppler signal from each of the reflected signals, and means for comparing the phase of the Doppler signals to provide an indication of range to the target.

3. In a continuous wave Doppler phase comparison radar system, the combination comprising, a reflex klystron oscillator including a repeller electrode, means for generating a square wave modulating voltage, means coupled to said first mentioned means for applying said square wave modulating voltage to said repeller electrode whereby the frequency of the energy generated by said reflex klystron is switched periodically between two frequencies, means coupled to said reflex klystron oscillator for transmitting the energy generated by said reflex klystron oscillator and for receiving reflected energy reflected from an object, said reflected energy containing two Doppler signals that are caused by the energy of different frequencies impinging upon an object that has relative velocity with respect to the system, detector means coupled to said last mentioned means for detecting said two Doppler signals in the reflected energy from the target, means coupled to said detector means for separating the Doppler signals, and means for comparing the phase of said Doppler signals to give an indication of range to the target.

4. In a continuous wave Doppler phase comparison radar system, the combination comprising, a reflex klystron oscillator including a repeller electrode, means for generating a square wave modulating voltage, means coupled to said first mentioned means for applying said square wave modulating voltage to said repeller electrode whereby the frequency of the energy generated by said reflex klystron is switched periodically between two frequencies, means coupled to said reflex klystron oscillator for transmitting the energy generated by said reflex klystron oscillator and for receiving reflected energy reflected from an object, said reflected energy containing two Doppler signals that are caused by the energy of different frequencies impinging upon an object that has relative velocity with respect to the system, detector means coupled to said last mentioned means for detecting said two Doppler signals in the reflected energy from the target, a Doppler signal separator connected to said detector means, said Doppler separator including a first gating circuit and a second gating circuit, means for gating first and said second gating circuits in synchronism with said square wave modulating voltage applied to said repeller electrode of said reflex klystron oscillator whereby said first gating circuit passes one of said Doppler signals and said second gating circuit passes the other of said Doppler signal, and means coupled to said first and second gating circuits for comparing the phase of said two Doppler signals to give an indication of range.

5. In a continuous wave Doppler phase comparison radar system, the combination comprising a microwave generator, modulating means coupled to said microwave generator for switching the frequency of the microwave energy generated alternately and periodically between two different frequencies, means coupled to said microwave generator for transmitting the microwave energy of the two different frequencies toward an object and for receiving the energy reflected from the object, detecting means coupled to said last mentioned means for detecting the two Doppler signals contained in said reflected energy that result from the transmitted energy of the two different frequencies being reflected from a target having relative velocity with respect to said system, separator means coupled to said detector means for separating said two Doppler signals, and phase comparison means coupled to said separator means for comparing the phase of said Doppler signals to give an indication of range between the target and the system.

6. The continuous wave Doppler phase comparison radar system of claim 5 in which said separator means includes a first and a second gating circuit and in which said first and said second gating circuits are gated alternately in synchronism with the switching of the frequency of said microwave generator.

No references cited.